United States Patent [19]

Atkins

[11] Patent Number: 5,513,059
[45] Date of Patent: Apr. 30, 1996

[54] ARRANGEMENT FOR PROTECTING TELECOMMUNICATIONS EQUIPMENT FROM VOLTAGE TRANSIENTS

[75] Inventor: Ian P. Atkins, Swindon, England

[73] Assignee: Raychem Limited, United Kingdom

[21] Appl. No.: 442,030

[22] Filed: May 16, 1995

Related U.S. Application Data

[63] Continuation of Ser. No. 291,782, Aug. 17, 1994, Pat. No. 5,416,663, which is a continuation of Ser. No. 30,307, May 13, 1993, abandoned.

[30] Foreign Application Priority Data

Sep. 28, 1990 [GB] United Kingdom ............... 9021222

[51] Int. Cl.[6] ................................................ H02H 9/04
[52] U.S. Cl. ......................... 361/56; 361/113; 361/119
[58] Field of Search ............................. 361/113, 111, 361/118, 119, 56

[56] References Cited

U.S. PATENT DOCUMENTS

| | | | |
|---|---|---|---|
| 3,824,431 | 7/1974 | Schlicke | 317/61 |
| 4,021,760 | 5/1977 | Campi | 333/70 R |
| 4,095,163 | 6/1978 | Montague | 323/8 |
| 4,156,838 | 5/1979 | Montague | 323/8 |
| 4,238,812 | 12/1980 | Middleman et al. | 361/106 |
| 4,329,726 | 5/1982 | Middleman et al. | 361/58 |
| 4,434,396 | 2/1984 | Montague | 361/111 |
| 4,586,104 | 4/1986 | Standler | 361/91 |
| 4,630,163 | 12/1986 | Cooper et al. | 361/56 |
| 4,887,180 | 12/1989 | Climent et al. | 361/91 |
| 4,941,063 | 7/1990 | McCartney | 361/119 |
| 5,416,663 | 5/1995 | Atkins | 361/119 |

FOREIGN PATENT DOCUMENTS

| | | |
|---|---|---|
| 590491 | 11/1989 | Australia . |
| 0259178 | 3/1988 | European Pat. Off. . |
| 0292082 | 11/1988 | European Pat. Off. . |
| 0338107 | 10/1989 | European Pat. Off. . |
| WO90/00826 | 1/1990 | WIPO . |
| WO90/00827 | 1/1990 | WIPO . |

Primary Examiner—Todd DeBoer
Attorney, Agent, or Firm—Herbert G. Burkard; Bruce M. Bertram; Marguerite E. Gerstner

[57] ABSTRACT

An arrangement for protecting an electrical circuit such as a telephone circuit from a voltage transient comprises a voltage clamp or foldback device (3) arranged to be connected between a current-carrying line (1) and ground (1'), a capacitor (2) in series with it, and an inductance (4) series connected in the line. During normal operation the arrangement acts as an LC filter whose high frequency break-point is determined by the capacitance of the voltage clamp or foldback device (3) and the value of the inductance (4) which are chosen to give a break point of 1 kHz to 10 MHz. However, when the arrangement is subjected to a voltage transient, the voltage clamp or foldback device (3) fires causing the break-point to fall to a value determined by the values of the capacitor (2) and inductance (4). The arrangement may be used, for example, to protect the circuit against a rapid voltage drop caused by the firing of another circuit protection device such as a gas discharge tube 5.

17 Claims, 2 Drawing Sheets

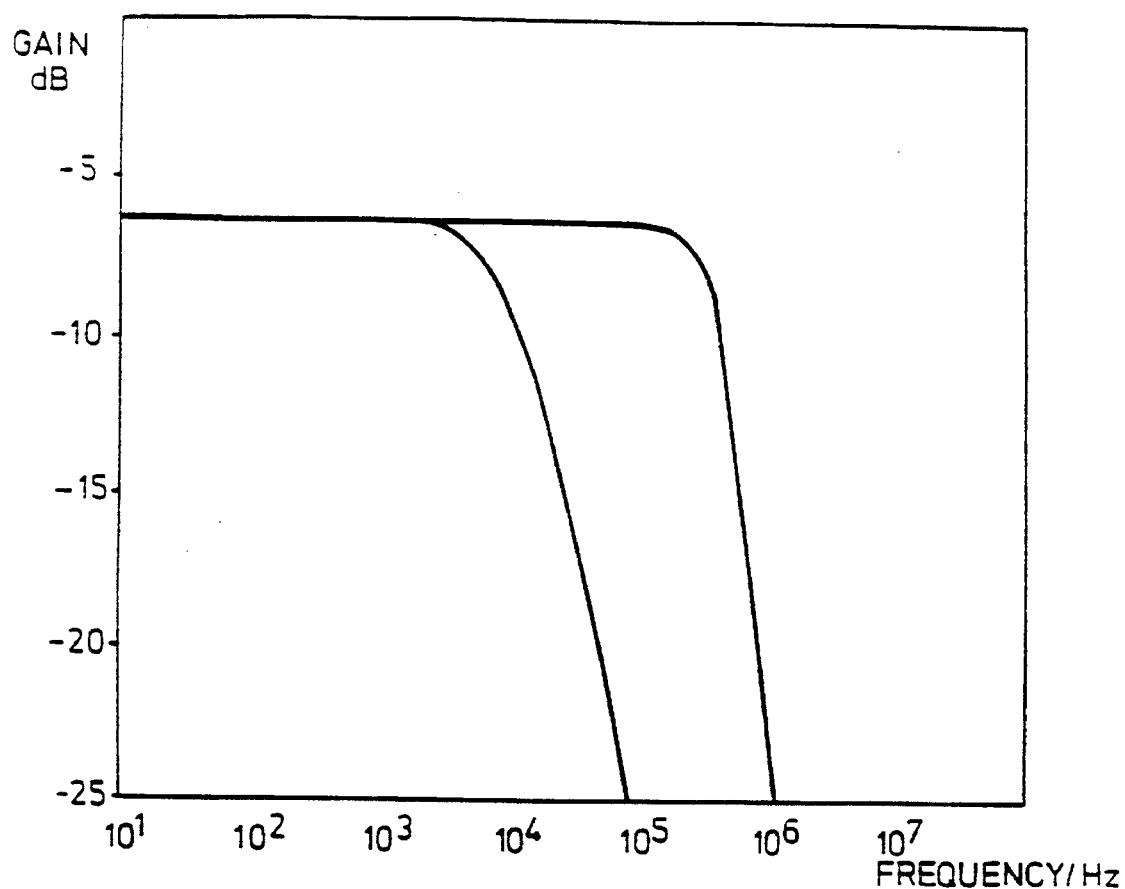
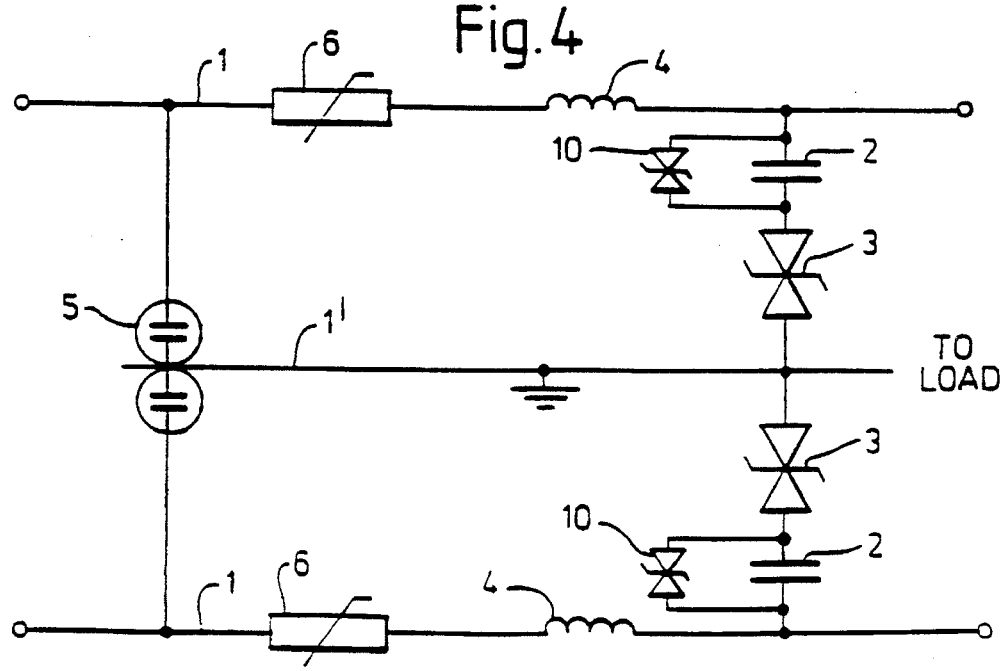

ARRANGEMENT FOR PROTECTING TELECOMMUNICATIONS EQUIPMENT FROM VOLTAGE TRANSIENTS

This application is a continuation of Ser. No. 291,782, now U.S. Pat. No. 5,416,663 filed Aug. 17, 1994 which is a continuation of Patent Application Ser. No. 08/030,307 filed May 13, 1993, now abandoned.

This invention relates to the protection of telecommunications equipment from voltage transients.

Voltage transients may be produced in electrical circuits by a variety of methods, for example by lightning, electrostatic discharge or pulses generated by operation of electrical equipment. These phenomena may all induce very large currents on cables and structures such as, for example telecommunications equipment, aircraft, and ships which can penetrate and damage electrical systems, either causing hardware damage such as semiconductor damage or electronic upset such as transmission loss or loss of stored data.

Electrostatic discharges are extremely fast discharges from a capacitor such as a human body. These discharges, because they can be so local, present a great threat to the individual electronic components. Induced electrical transients caused by lightning represent a threat to electrical/ electronic equipment especially in telecommunications equipment.

According to the present invention, there is provided an arrangement for protecting telecommunications equipment from a voltage transient, which comprises a voltage clamping device connected or arranged to be connected between a current-carrying line of the circuit and ground, a capacitor having a capacitance up to 1 μF connected in series with the voltage clamping device and an inductance of from 1 uH to 100 mH series connected in the line, and a high energy foldback device connected between the current-carrying line and ground, under normal operating conditions the arrangement acting as an LC filter whose high frequency breakpoint is determined by the capacitance of the voltage clamping device and any additional capacitor optionally connected in parallel therewith, and the inductance and is in the range of from 1 kHz to 10 MHz preferably from 10 kHz to 5 MHz, the high frequency break-point falling when the arrangement is subjected to a voltage transient sufficient to cause the voltage clamping device to conduct, to a value that is determined by the values of the capacitor and the inductance.

The voltage clamping device may be selected from a number of devices that have voltage limiting properties, for example a back-to-back diode arrangement in which the diodes may comprise semiconductor diodes, avalanche diodes or Zener diodes. Alternatively, non-linear resistors may be employed such as zinc oxide, silicon carbide or other varistor materials. The voltage clamping device may, if desired, comprise a MIM or nin device or a gaseous voltage regulator. MIM and nin devices that may be employed in the invention are described in our International Applications Nos. PCT/GB89/00809 and PCT/GB89/00808.

The preferred voltage clamping devices are bidirectional clamping diodes, for example as sold under the tradename TransZorb. The clamping devices will normally have a stray capacitance in the range of from 10 pF to 10 nF and especially from 100 pF to 5 nF. In some instances the stray capacitance of the voltage clamping device may be too low, in which case a small capacitor may be connected in parallel with it to bring the resultant capacitance within the preferred range.

As stated above, the inductance has a value, in the range of from 1 uH to 100 mH, preferably it has a value of up to 1 mH. This may, for example be achieved by utilizing the stray inductance of a wire wound resistor. In some circumstances it my be preferable instead to employ a small inductor. The inductance will normally have an associated resistance of from 1 to 50 ohms, especially from 3 to 10 ohms. The resistance may be chosen so that the total resistance of all series connected components in the line is within acceptable limits.

The capacitor has a capacitance of up to 1 mF, and preferably has a capacitance of at least 100 pF, especially at least 10 nF. In most cases it will be preferred for the capacitor to have a capacitance that is at least ten times the stray capacitance of the voltage clamping device, and preferably at least 100 times the stray capacitance. Where the capacitance is 100 times that of the voltage clamping device the high frequency break point should fall when subjected to a transient, to about one tenth the frequency of the break point under normal operating conditions.

The arrangement according to the invention has the advantage that under normal operating conditions it acts as a low pass filter with a relatively high break point, but that when it is subjected to a transient its high frequency gain is immediately reduced significantly. Thus, for example, where the break point falls to one tenth of its original frequency the gain magnitude at frequencies above the normal operating break point will be reduced by 40 dB.

The high-energy foldback device employed in the arrangement is intended to protect the circuit against higher energy, longer duration overvoltages. It may, for example, comprise a spark gap or gas discharge tube (GDT) or a voltage controlled triac connected between the conductor and ground for shunting high energy transients to ground. Such components can, in some circumstances, cause damage to the circuit they are used to protect by forming pulses having very rapidly changing voltages. For example, if a GDT is subjected to a transient that has a rising edge of 1 kV us$^{-1}$ it may switch at, say, 500 V whereupon the transient voltage falls to zero in about 1 ns; thereby causing the transient that is transmitted to have a falling edge of 500 kV us$^{-1}$. Such a rate of change of voltage can cause permanent damage to the circuit load. However, in the present invention, the reduction in the break point frequency caused by switching of the voltage clamp will reduce the slope of the falling edge of that part of the transient that is let through the arrangement.

In addition the arrangement may include an overcurrent protection device series connected in the line between the additional, higher energy overvoltage device end the voltage clamping device in order to protect the circuit from long lasting overvoltages, for example caused by system failure, or by accidental or malicious connection of mains supply. Suitable devices include positive temperature coefficient (PTC) devices, e.g. ceramic or polymeric PTC devices, preferably polymeric devices, for example as described in U.S. Pat. Nos. 4,238,812 and 4,329,726 to Middleman et al. Such devices are available from Raychem Corporation under the registered trademark "PolySwitch".

Since the circuit acts as a low pass filter both in its unswitched and switched state, it has the disadvantage that it cannot protect the circuit from DC or very low frequency overvoltages that are not great enough to cause the GDT or PTC device to switch. This may be overcome by connecting an additional voltage clamp or foldback device across the capacitor. In this case the voltage clamp or foldback device in series with the capacitor and the clamp connected across the capacitor should have a combined clamping or threshold voltage that is greater than the normal equipment voltage. The term "foldback device" is used in this specification to mean a device which exhibits a high electrical resistance, e.g. at least 100 kohms, preferably at least 1 Mohm, and especially at least 10 Mohms, at low electrical voltages, but whose resistance falls from a high value to a low value, e.g. less than 10 ohms, when subjected to a high voltage (the lowest such voltage being referred to as the "threshold voltage"). The device will remain in its low resistance state only for as long as a small "holding current" is maintained through the device, otherwise it will automatically revert to its high resistance state. Suitable foldback devices include voltage controlled triacs, voltage controlled thyristors, and gas discharge tubes.

The arrangement according to the invention may be employed in telephone equipment where, for example, a balanced pair of lines having a common ground is used. In this case a circuit protection unit may be employed which comprised a pair of arrangements according to the invention arranged to be series connected in a pair of current-carrying lines and connected to a common ground.

Two forms of arrangement according to the invention will now be described by way of example with reference to the accompanying drawings in which:

FIG. 3 is a Bode diagram showing the performance of the circuit of FIG. 1; and

FIG. 4 is a circuit diagram of a modification of the circuit shown in FIG. 1.

Figure 1:
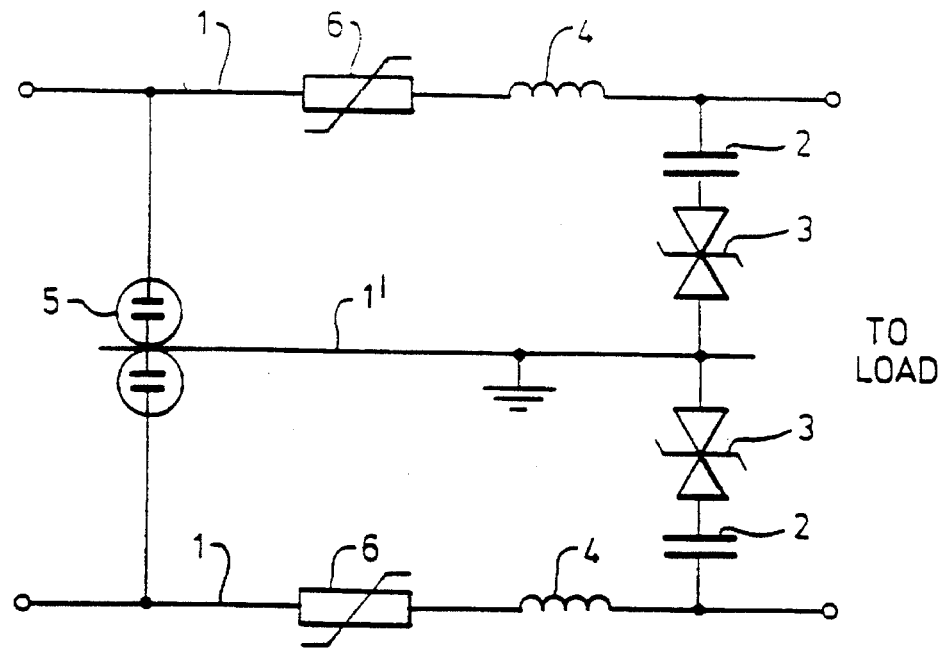
FIG. 1 is a circuit diagram of one form of arrangement in accordance with the invention.

Referring to FIG. 1 of the accompanying drawings, a five terminal telephone circuit protection module has a balanced pair of lines 1 and a common ground line 1'. Two identical circuit protection arrangements are provided, one associated with each line of the module. The arrangements each comprise a bidirectional voltage clamping diode 3 connected between the line 1 and ground 1', a 100 nF capacitor 2 connected in series with the clamping diode 3, and a 200 uH inductor 4 in series connected in the line. In addition, the arrangement includes a GDT 5 connected between the line 1 and ground, and a PTC device 6 series connected in the line. The PTC device 6 has a low temperature resistance of about 6 ohms so that the total line resistance of the module is 6 ohms plus the resistance of the inductor 4.

Figure 2:
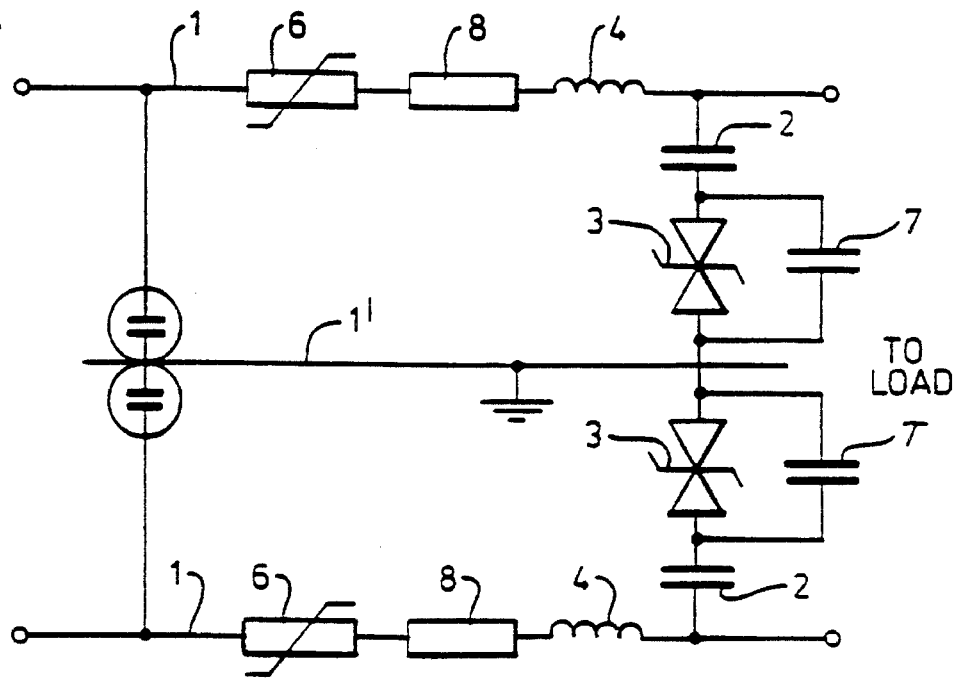
FIG. 2 is a diagram of the circuit of FIG. 1 with some of the parasitic values shown.

FIG. 2 shows the circuit of FIG. 1 and indicates the most important stray quantities, namely the stray capacitance 7 of the voltage clamping device 3 and the resistance 8 of the inductor 4. Capacitance 7 is approximately 2 nF and resistance 8 is 5.6 ohms.

The performance of the arrangement is shown in FIG. 3. In normal operation the arrangement acts as a low pass RLC filter whose capacitance is given by the series connected capacitor 2 and stray capacitance of the clamping diode 3. When the unit is subjected to a voltage transient the clamping diode 3 will clamp the voltage between the line 1 and ground, with the result that the capacitance of the filter circuit is given by capacitor 2 above. The break point of the filter is therefore reduced to about one tenth the frequency of the original break point and the gain at frequencies above the normal operating break point is reduced by about 40 dB. When the GDT fires, the voltage on the line 1 will fall to zero within about 1 ns which corresponds to a voltage reduction of about 500 kV us$^{-1}$. The reduced frequency band of the filter will, however, limit the rate of fall of the voltage at the output of the unit to about 500 V us$^{-1}$.

FIG. 4 shows a modification of the circuit shown in FIG. 1 which will provide protection to a circuit against DC overvoltages. This circuit corresponds to that shown in FIG. 1 with the addition of a further bidirectional voltage clamping diode 10 connected across the capacitor 2. The clamping diode 10 has a breakdown voltage such that the sum of the breakdown voltages of the two diodes 3 and 10 is greater than the maximum system voltage.

I claim:

1. An arrangement for protecting an electrical circuit from a voltage transient, wherein the circuit comprises telecommunications equipment comprising a current carrying line and a high-energy foldback device connected between the current-carrying line and ground, said arrangement comprising (1) a voltage clamping device which has a first capacitance and which, in use, is connected between the current-carrying line of the circuit and ground, (2) a capacitor which has a second capacitance of up to 1 µF and which is connected in series with the voltage clamping device, and (3) an inductor which has an inductance of from 1 µH to 100 mH, and which, in use, is series connected in the current-carrying line, the arrangement, when in use under normal operating conditions acting as an LC filter having a first high frequency break-point which (a) is determined by
      (i) the first capacitance,
      (ii) the capacitance of any additional capacitor optionally connected in parallel with the voltage clamping device, and (iii) the inductance, and (b) is in the range of from 1 kHz to 10 Mhz, and the arrangement, when in use while the arrangement is subjected to a voltage transient sufficient to cause the voltage clamping device to conduct, acting as an LC filter having a second high frequency break point which is lower than the first high frequency break point and which is determined by the second capacitance and the inductance.

2. An arrangement as claimed in claim 1, wherein the inductance has a value up to 1 mH.

3. An arrangement as claimed in claim 1, which has a total series resistance in the current-carrying line in the range of from 1 to 50 ohms.

4. An arrangement as claimed in claim 3, which has a total series resistance in the current-carrying line in the range of from 3 to 10 ohms.

5. An arrangement as claimed in claim 1, wherein the second high frequency break-point is not higher than 0.1 times the first high frequency break-point.

6. An arrangement as claimed in claim 1, further comprising an overcurrent protection device series connected in the current-carrying line.

7. An arrangement as claimed in claim 6, wherein the overcurrent protection device is a PTC device.

8. An arrangement as claimed in claim 1, further comprising a voltage clamping or foldback device connected across the capacitor.

9. A circuit protection unit which comprises a pair of arrangements for protecting an electrical circuit from a voltage transient, wherein the circuit comprises telecommunications equipment comprising a pair of current carrying lines having a common ground, with a high-energy foldback device connected between each of the current-carrying lines and the common ground, each of the pair of arrangements comprising:

(1) a voltage clamping device which has a first capacitance and which, in use, is connected between a current-carrying line of the circuit and the common ground, (2) a capacitor which has a second capacitance of up to 1 µF and which is connected in series with the voltage clamping device, and (3) an inductor which has an inductance of from 1 µH to 100 mH, and which, in use, is series connected in the current-carrying line, each of the pair of arrangements, when in use under normal operating conditions acting as an LC filter having a first high frequency break-point which (a) is determined by
  (i) the first capacitance,
  (ii) the capacitance of any additional capacitor optionally connected in parallel with the voltage clamping device, and
  (iii) the inductance, and
(b) is in the range of from 1 kHz and 10 Mhz, and when each arrangement, while in use, is subjected to a voltage transient sufficient to cause the voltage clamping device to conduct, acting as an LC filter having a second high frequency break-point which is lower than the first high frequency break-point and which is determined by the second capacitance and the inductance.

10. An electrical circuit, comprising:

a. telecommunications equipment comprising a current-carrying line and ground;

b. a high-energy foldback device connected between the current-carrying line and ground; and c. an arrangement for protecting the electrical circuit from a voltage transient, the arrangement comprising
  (1) a voltage clamping device which has a first capacitance and which is connected between the current-carrying line of the circuit and ground,
  (2) a capacitor which has a second capacitance of up to 1 µF and which is connected in series with the voltage clamping device, and
  (3) an inductor which has an inductance of from 1 µH to 100 mH, and which is series connected in the current-carrying line, the arrangement, under normal operating conditions, acting as an LC filter having a first high frequency break-point which (a) is determined by
  (i) the first capacitance,
  (ii) the capacitance of any additional capacitor optionally connected in parallel with the voltage clamping device, and
  (iii) the inductance, and
(b) is in the range of from 1 kHz to 10 Mhz, and the arrangement, when the arrangement is subjected to a voltage transient sufficient to cause the voltage clamping device to conduct, acting as an LC filter having a second high frequency break point which is lower than the first high frequency break point and which is determined by the second capacitance and the inductance.

11. A circuit as claimed in claim 10, wherein the inductance has a value of up to 1 mH.

12. A circuit as claimed in claim 10, which has a total series resistance in the current-carrying line in the range of from 1 to 50 ohms.

13. A circuit as claimed in claim 10, which has a total series resistance in the current-carrying line in the range of from 3 to 10 ohms.

14. A circuit as claimed in claim 10, wherein the second high frequency break-point is not higher than 0.1 times the first high frequency break-point.

15. A circuit as claimed in claim 10, further comprising an overcurrent protection device series connected in the current-carrying line.

16. A circuit as claimed in claim 15, wherein the overcurrent protection device is a PTC device.

17. A circuit as claimed in claim 10, further comprising a voltage clamping or foldback device connected across the capacitor.

* * * * *